United States Patent [19]

Günter et al.

[11] Patent Number: 4,555,412

[45] Date of Patent: Nov. 26, 1985

[54] PROCESS FOR APPLYING A COATING TO A SUBSTRATE AND A LIQUID AQUEOUS COMPOSITION TO BE USED THEREIN

[75] Inventors: Gerhard Günter, Ettlingen; Hartmut Haeufler, Aldingen, both of Fed. Rep. of Germany

[73] Assignee: Akzo nv, Arnhem, Netherlands

[21] Appl. No.: 357,819

[22] Filed: Mar. 15, 1982

[51] Int. Cl.$^4$ .................. B05D 1/04; B05D 3/02
[52] U.S. Cl. ........................ 427/27; 427/386; 427/388.1; 427/388.2; 427/388.4; 523/402; 523/414; 523/420; 524/901; 524/902; 525/523; 525/531
[58] Field of Search .................. 427/386, 388.1, 388.2, 427/27, 388.4; 204/181 R, 181 C; 525/531, 523; 524/901, 902; 523/414, 402, 420

[56] References Cited

U.S. PATENT DOCUMENTS

| | | | |
|---|---|---|---|
| 3,050,493 | 8/1962 | Wagner et al. | 523/420 X |
| 3,870,666 | 3/1975 | Becker | 523/404 |
| 4,067,838 | 1/1978 | Hayashi et al. | 523/404 |
| 4,096,105 | 6/1978 | McGinniss | 523/420 |
| 4,105,613 | 8/1978 | Clope et al. | 427/27 X |
| 4,129,490 | 12/1978 | Schimmel | 204/181 C |
| 4,192,929 | 3/1980 | Wingfield, Jr. | 523/404 X |
| 4,252,703 | 2/1981 | Patzschke et al. | 523/404 |
| 4,269,866 | 5/1981 | Günter et al. | 427/27 |
| 4,352,898 | 10/1982 | Albers | 523/414 |

Primary Examiner—Thurman K. Page
Attorney, Agent, or Firm—Stevens, Davis, Miller & Mosher

[57] ABSTRACT

A process is provided for applying a coating to a substrate by bringing the substrate into contact with a liquid aqueous coating composition comprising a solid powdered epoxy group-containing compound having a number average molecular weight of at least 1,000, an epoxy equivalent weight of 450–7,500 and an average particle size of 0.5–35 μm, dispersed in an aqueous medium containing an ionized polyamino compound having primary or secondary groups, the ratio of the number of reactive groups of the polyamino compound to the number of epoxy groups of the epoxy compound being at least 0.4. The coating composition is applied to the substrate at a temperature of 5°–65° C. and the resulting coating layer is cured at a temperature of 70°–220° C. This invention also relates to the liquid aqueous coating composition to be used in said process.

14 Claims, No Drawings

PROCESS FOR APPLYING A COATING TO A SUBSTRATE AND A LIQUID AQUEOUS COMPOSITION TO BE USED THEREIN

This invention relates to a process for applying a coating to a substrate by bringing the substrate into contact with a liquid aqueous coating composition at a temperature in the range of 5° to 65° C., so that a coating of the coating composition is formed on the substrate, which coating is subsequently cured at a temperature in the range of 70° to 220° C.

An object of the invention is to provide a coating composition which is suitable for industrial use, more particularly in the automobile sector, for instance as an excellent protection from damage by road metal. The coating composition is only slightly viscous, in spite of its high solids content; displays rapid physical drying as a result of the evaporation of water; and does not give rise to air pollution from organic solvents because there is no need for their presence. An additional advantage attained by the absence of organic solvents is the fact that it prevents an epoxy resin from being solvated or swollen, thereby preventing agglomeration of solid epoxy resin particles. Further, the coating composition can be readily applied and gives a smooth film surface without irregularities. Another advantage is the fact that the dried up remains of the coating composition can still be removed even after a very long time, for instance a few days, by washing with water. Another very important advantage is the fact that the present aqueous coating composition displays a very good storage stability or long pot life, despite the fact that the composition contains both the binder and the curing agent. This is of great importance in the event of plant stops, or when the composition is to be pumped through ring conduits or if it is to be stored in large drums. Experiments have demonstrated that the present composition generally has a storage stability at 20° C. of at least 150 days storage stability. This is even more surprising in light of the fact that aqueous compositions made up of liquid epoxy resins and curing agents have a storage stability at 20° C. of not more than a few hours. French Patent Application No. 2 105 161 discloses a non-aqueous mixture of a liquid or semi-solid polyepoxy compound having an epoxy equivalent weight not higher than about 375 and a particular salt of a primary or secondary amine as curing agent for the epoxy resin.

The process according to the present invention is characterized in that the coating composition comprises a dispersion of a solid epoxy group-containing compound having a number average molecular weight of at least 1000, an epoxy equivalent weight in the range of 450 to 7500 and an average particle size of 0.5 to 35 μm in an aqueous medium comprising an ionized polyamino compound having primary or secondary amino groups as curing agent for the epoxy compound, the ratio of the number of reactive groups of the polyamino compound to the number of epoxy groups of the epoxy compound being at least 0.4.

The solid epoxy group-containing compound contains at least 1, but preferably 2 or more, epoxy groups per molecule. For brevity purposes, the epoxy group-containing compound is referred to hereinafter as epoxy resin. Examples of suitable solid epoxy resins include glycidyl group-containing resins such as polyacrylic resins, polyesters, polyethers or polyurethanes, all of which contains one or more glycidyl groups per molecule. It is preferred that as the epoxy resin there should be used a compound of the following general formula:

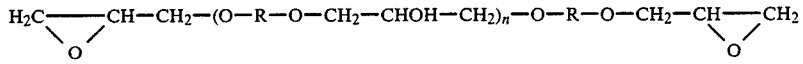

where R represents an aliphatic, cycloaliphatic or aromatic group and n is a number between 0 and 150, preferably between 0 and 60. Examples of such epoxy resins include the glycidyl ethers of, for instance, ethylene glycol, diethylene glycol, triethylene glycol, 1,2-propylene glycol, 1,3-propylene glycol, 1,5-pentane diol, bis-(4-hydroxycyclohexyl)-2,2-propane, 4,4'-dihydroxybenzophenone, bis-(4-hydroxyphenyl)-methane, bis-(4-hydroxyphenyl)-1,1-ethane, bis-(4-hydroxyphenyl)-1,1-isobutane and 1,5-dihydroxynaphthalene. Optionally, use may be made of polyglycidyl ethers of compounds such as glycerol or 1,2,6-hexane triol. Special preference is given to the use of diglycidyl ether based on bis-(4-hydroxyphenyl)-2,2-propane. Alternatively, use may be made, if desired, of mixtures of epoxy resins. It is preferred that the epoxy equivalent weight of the epoxy resin(s) should be 600 to 2000, more particularly 800 to 1500. It is preferred that the epoxy resin should have a number average molecular weight in the range of 1000 to 15 000. The solid, powdered epoxy resin has a melting point which is between 40° C. and the baking temperature, which is in the range of 70° to 220° C., preferably of 100° to 160° C. It is preferred that the melting point should be between 70° and 130° C. The average particle size of the solid, powdered epoxy resin is in the range of 0.5 to 35 μm, preferably 2 to 25 μm.

The polyamino compound which, according to the present invention, is used as the starting compound for the curing agent for the solid powdered epoxy resin is generally a compound having at least 2 primary or secondary amino groups per molecule. The compounds may be low molecular or high molecular. Optionally, use may be made of mixtures of polyamino compounds. Examples of suitable low molecular polyamino compounds include diamines, such as ethylene diamine, isophoron diamine and/or xylylene diamine; polyamines, such as diethylene triamine, dipropylene triamine and/or triethylene tetramine; and mixtures of various polyamino compounds.

Examples of suitable high molecular polyamino compounds include polyaminoamido resins; adducts of primary amines to compounds having 2 or more epoxy groups; polymers of amino(meth)acrylates, with the amino groups being primary or secondary; and primary or secondary amino groups-containing polymers of ethylenically unsaturated compounds. It is preferred that use should be made of polyaminoamido resin. These high molecular polyamino compounds generally have an amino number of 30 to 400, preferably 50 to 260.

Examples of representative polyaminoamido resins include the resins that are made available by polycondensation of one or more di- or polyvalent polyamines, for instance ethylene diamine or diethylene triamine, with one or more dicarboxylic acids, for instance adipic acid, isophthalic acid and dimerized fatty acid. Optionally, the polycondensation may be carried out in the presence of a monocarboxylic acid.

Suitable adducts of primary amines to epoxy compounds are obtained by addition of amines having at least a primary amino group, such as ethanolamine, butylamine, ethylene diamine and diethylene triamine, to compounds having 2 or more epoxy groups.

Examples of suitable epoxy starting compounds include glycidyl ethers of di- or polyvalent phenols such as Bisphenol-A and Bisphenol-F; polyglycidyl ethers of phenolaldehyde polycondensates; epoxidized polyalkadienes, such as epoxidized polybutadiene; hydantoin epoxy resins and polymers of ethylenically unsaturated compounds having epoxy groups, such as glycidyl(meth)acrylate, N-glycidyl(meth)acrylamide and/or allylglycidyl ether, and optionally of one or more other copolymerizable, ethylenically unsaturated monomers. The epoxy compounds generally have a number average molecular weight in the range of 200 to 20 000.

Examples of suitable polymers of amino(meth)acrylates include homo- or copolymers of compounds such as aminoethyl(meth)acrylate, aminobutyl(meth)acrylate, methylaminoethyl(meth)acrylate, and/or hydroxyethyl aminoethyl(meth)acrylate, and, optionally, of one or more other copolymerizable, ethylenically unsaturated compounds such as methyl(meth)acrylate, ethyl(meth)acrylate, butyl(meth)acrylate, 2-ethylhexyl(meth)acrylate, (meth)acrylonitrile, 2-hydroxyethyl(meth)acrylate, glycidyl(meth)acrylate, styrene, α-methyl styrene, vinyl toluene, vinyl acetate, vinyl chloride and/or vinyl isobutyl ether.

The above-mentioned curing agents are generally known and need not be further described here (see, e.g., Lee and Neville, Handbook of Epoxy Resins, McGraw Hill, New York).

According to the invention, the polyamino compound to be used as curing agent should be ionized. Ionization may be effected with any organic or inorganic acid, for instance: hydrochloric acid, sulphuric acid, phosphoric acid, phosphorous acid, carbonic acid, formic acid, acetic acid, propionic acid, lactic acid, citric acid, malic acid, tartaric acid and/or acrylic acid.

According to the invention the ratio of the number of reactive groups of the polyamino compound to the number of epoxy groups of the epoxy group-containing compound is at least 0.4, preferably at least 0.8. The weight ratio of the polyamino compound to the epoxy group-containing compound is preferably 0.2-2, and more particularly in the range of ½ to 0.99.

The aqueous coating composition may be formed from the solid epoxy compound, the ionized polyamino compound and water in any convenient manner. It may contain the usual additives, for instance: pigments, fillers, levelling agents, anti-foam agents, dispersing agents, agents influencing the rheological properties, corrosion inhibiting agents and, if desired, organic solvents. However, one or more of these additives, more particularly pigments and/or levelling agents, may be previously mixed with the epoxy resin. Optionally, the coating composition may contain additional curing agents, for instance water-soluble or water-dispersible amino resins, such as urea formaldehyde resins or melamine formaldehyde resins.

The coating composition may be applied to the substrate in any desirable manner, for instance, by roller coating, spraying, brushing, sprinkling, flow coating or dipping. It is preferred, however, that the coating composition should be applied to the substrate by electrostatic spraying at a voltage of 30-140 kV. It should be added that in the process according to the invention the coating composition is applied to the substrate without making use of electric equipment employed in coating by electrophoresis.

The coating composition applied is baked and crosslinked at a temperature which is above the melting point of the solid epoxy resin. The temperatures used are in the range of 70° to 220° C., preferably 100° to 160° C.

The substrate may be of a metal or a synthetic material. Examples of suitable metals include iron, steel, zinc and aluminium. The properties of the baked coating obtained by the process according to the invention are at least comparable with those of the usual baked coatings.

The invention is illustrated but not limited by the following examples. In these examples, the Erichsen indentation value is measured in accordance with DIN 53156 and expressed in mm, the hardness is determined in accordance with DIN 53157, and the elongation in accordance with ASTM D 522-60. The resistance to corrosion is determined by subjecting a test specimen to a salt spray test for 24 hours in conformity with DIN 50021. The distance (in mm) is measured between a scratch and the point at which there still occurs underrusting. Further, the panels coated are subjected to the humidity cabinet test for 240 hours in accordance with DIN 50017 and they are kept immersed in water for 24 hours at a temperature of 40° C. In these tests the coating does not display any blistering in any of the test specimen. Moreover, all of the coatings demonstrate a very good to excellent resistance to damage by road metal. The viscosity is determined in accordance with DIN 53211 and expressed in seconds (unless otherwise indicated).

EXAMPLE I 16 parts by weight of a partly acetic acid-neutralized, 50% by weight aqueous dispersion of a polyaminoamido resin from triethylene tetramine and monomeric and dimeric fatty acids having an equivalent weight of active H of 100-165 (available under the trade name Versamid 125 of Schering) were mixed with 18 parts by weight of titanium dioxide, 8 parts by weight of barium sulphate and 5 parts by weight of talc, followed by grinding the mixture into a fineness smaller than 15 μm. Next, there was added to the mixture 3 parts by weight of a 60% by weight aqueous acetic acid solution, 32 parts by weight of a diglycidyl ether of Bisphenol-A (available under the trade name DER 663 U of Dow Chemical; number average molecular weight: 1600; epoxy equivalent weight: 730-840) having an average particle size of 12 μm and water in an amount such that the resulting coating composition had a viscosity of 20 seconds. Finally, the coating composition obtained was sprayed onto a bright steel panel in a thickness of 35 μm (in the cured state) at a temperature of 15° C. and cured for 20 minutes at a temperature of 140° C. The measured properties of the coating obtained are mentioned in Table 1.

EXAMPLE II

The procedure of Example I was repeated, with the exception that the dispersion of the polyaminoamido resin was used in an amount of 24 parts by weight. The coating composition obtained was applied to the panel in a thickness of 40 μm (in the cured state). The measured properties of the coating are mentioned in Table 1.

EXAMPLE III 32 parts by weight of the 50% by weight aqueous dispersion of the polyaminoamido resin of Example I were mixed with 5 parts by weight of channel black, 5 parts by weight of talc and 1 part by weight of a 60% by weight aqueous acetic acid solution and subsequently ground into a fineness smaller than 10 μm. Subsequently, there were added to the mixture 32 parts by weight of a glycidyl groups-containing acrylate resin (available under the trade name VP-CM 36/41 of Degussa) having an average particle size less than 12 μm, 5 parts by weight of a water-soluble melamine resin and water in an amount such that the resulting coating composition had a viscosity of 25 seconds. Finally, the coating composition obtained was brushed onto a panel of phosphated steel in a thickness of 40 μm (in the cured state) at a temperature of 18° C. and cured for 30 minutes at a temperature of 150° C. The measured properties of the resulting coating are mentioned in Table 1.

EXAMPLE IV

The procedure of Example III was repeated, except that the glycidyl groups-containing acrylate resin was used in an amount of 96 parts by weight. The measured properties of the resulting coating are mentioned in Table 1.

EXAMPLE V

A mixture was prepared from 26 parts by weight of a 50% by weight aqueous dispersion of a polyvinyl propionate (known under the trade name Propiofan 5 D), 21 parts by weight of a diglycidyl ether of Bisphenol-A (available under the trade name Epikote 1004 of Shell; number average molecular weight: 1800; epoxy equivalent weight: 850–940) having an average particle size of 21 μm, 2.2 parts by weight of a 60% by weight aqueous solution of diethylene triamine neutralized with acetic acid, 15 parts by weight of barium sulphate and water. After 20 minutes the resulting coating composition, which had a Brookfield viscosity of 6.5 (measured with a No 6 spindle), was applied to a motor-car body pneumatically at a temperature of 16° C. The coating applied was kept at a temperature of 20° C. for 1 hour and subsequently cured for 20 minutes at a temperature of 120° to 130° C. Next, the coating, which had a thickness of 500 μm, was blasted twice, each time with 500 g steel grit at a pressure of 2 bar and a distance of 40 to 50 cm between the spray nozzle and the car body component. Upon examination of the coating it was found that the steel grit had not penetrated to the substrate, which shows that the coating offers excellent protection from damage by road metal.

EXAMPLE VI 32 parts by weight of a 25% by weight aqueous dispersion of the polyaminoamido resin from Example I were mixed with 47 parts by weight of a mixture of 71% by weight of a diglycidyl ether of Bisphenol-A (available under the trade name Epikote 1004 of Shell) and 29% by weight of titanium dioxide and 0.5 parts by weight of an antifoaming agent (available under the trade name Byk VP 020).

The resulting coating composition, which had a viscosity of 25 seconds, was applied to steel panels by flow coating at a temperature of 15° C. and cured for 20 minutes at a temperature of 150° C. The measured properties of the coating obtained are mentioned in Table 1.

EXAMPLE VII

The procedure of Example VI was repeated, with the exception that use was made of a pigmented epoxy resin to which 2.5% by weight of a levelling agent (available under the trade name Acronal 4F) had been added. Further, the coating composition obtained, which had a viscosity of 23 seconds, was applied by dip coating. The measured properties of the resulting coating are mentioned in Table 1.

EXAMPLE VIII 32 parts by weight of a 25% by weight aqueous dispersion of the polyaminoamido resin according to Example I were mixed with 32 parts by weight of a powdered mixture of 71% by weight of a bisglycidyl ether of Bisphenol-A (available under the trade name Epikote 1004 of Shell) and 29% by weight of titanium dioxide. The powdered, pigmented epoxy resin had a particle size not greater than 15 μm. The resulting coating composition, which had a viscosity of 24 seconds, was applied to steel panels in a coating thickness of 35 to 40 μm (in the cured state) by electrostatic spraying at a voltage of 80 to 100 kV and subsequently cured for 20 minutes at a temperature of 140° C. The measured properties of the resulting coating are mentioned in Table 1.

TABLE 1

| Example | Indentation value | Hardness | Elongation | Resistance to corrosion |
|---|---|---|---|---|
| I | 7 | 150 | no cracks | 6 |
| II | 5 | 160 | a few cracks | 4 |
| III | 1:5 | 140 | a few cracks | 11 |
| IV | 4:5 | 155 | no cracks | 9 |
| VI | 7 | 160 | no cracks | 6 |
| VII | 7 | 160 | no cracks | 6 |
| VIII | 5:5 | 145 | no cracks | 5 |

What is claimed is:

1. A process for applying a coating to a substrate by bringing the substrate into contact with an aqueous coating composition at a temperature in the range of 5° to 65° C., so that a coating of the coating composition is formed on the substrate, said coating being subsequently cured at a temperature in the range of 70° to 220° C., characterized in that the coating composition comprises a dispersion of an epoxy compound that is essentially a solid epoxy group-containing compound having a number average molecular weight of at least 1000, an epoxy equivalent weight in the range of 450 to 7500 and an average particle size of about 0.5 to 35 μm and a melting point between 40° C. and the baking temperature, in an aqueous medium comprising an ionized polyamino compound having primary or secondary amino groups as curing agent for the epoxy group-containing compound, the ratio of the number of reactive groups of the polyamino compound to the number of epoxy groups of the epoxy compound being at least 0.4.

2. The process of claim 1, wherein the solid epoxy group-containing compound has an epoxy equivalent weight in the range of 600 to 2000.

3. The process of claim 1, wherein the solid epoxy group-containing compound has an epoxy equivalent weight in the range of 800 to 1500.

4. The process of claim 1, wherein the solid epoxy group-containing compound has a number average molecular weight in the range of 1,000 to 15,000.

5. The process of claim 1, wherein the solid epoxy group-containing compound has a melting point in the range of 70° to 130° C.

6. The process of claim 1, wherein the solid epoxy group-containing compound has the general formula:

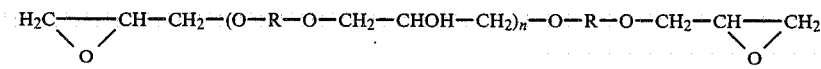

where R is an aliphatic, cycloaliphatic or aromatic group and n is a number between 0 and 150.

7. The process of claim 1, wherein the solid epoxy group-containing compound is a diglycidyl ether of bis-(4-hydroxyphenyl)-2,2-propane.

8. The process of claim 1, wherein the polyamino compound is a polyaminoamido resin.

9. The process of claim 1, wherein the ratio of the number of reactive groups of the polyamino compound to the number of epoxy groups of the epoxy group-containing compound is at least 0.8.

10. The process of claim 1, wherein the weight ratio of the polyamino compound to the epoxy group-containing compound is 0.2-2.

11. The process of claim 10, wherein the weight ratio is 0.5-0.99.

12. The process of claim 1, wherein the coating composition is applied to the substrate by electrostatic spraying.

13. The process of claim 1, wherein the coating applied is cured at a temperature in the range of 100° to 160° C.

14. A liquid aqueous coating composition to be used in the process according to any one of the preceding claims 1 to 12, characterized in that the coating composition comprises a dispersion of a solid epoxy group-containing compound having a number average molecular weight of at least 1000, an epoxy equivalent weight in the range of 450 to 7500 and an average particle size of 0.5 to 35 μm in an aqueous medium comprising an ionized polyamino compound having primary or secondary amino groups as curing agent for the epoxy compound, the ratio of the number of reactive groups of the polyamino compound to the number of epoxy groups of the epoxy compound being at least 0.4.

* * * * *

UNITED STATES PATENT AND TRADEMARK OFFICE
CERTIFICATE OF CORRECTION

PATENT NO. : 4,555,412

DATED : November 26, 1985

INVENTOR(S) : GUNTER et al

It is certified that error appears in the above-identified patent and that said Letters Patent is hereby corrected as shown below:

In the heading, add

--[30] Foreign Application Priority

Data --March 13, 1981 The Netherlands

8101236 --

Signed and Sealed this

Twenty-second Day of July 1986

[SEAL]

Attest:

DONALD J. QUIGG

Attesting Officer    Commissioner of Patents and Trademarks